United States Patent [19]
Kephart

[11] Patent Number: 5,563,452
[45] Date of Patent: Oct. 8, 1996

[54] CONTROL UNIT FOR VEHICLE-BORNE ELECTRICAL EQUIPMENT

[76] Inventor: David A. Kephart, 813 Logan Blvd., Hollidaysburg, Pa. 16648

[21] Appl. No.: 489,984

[22] Filed: Aug. 11, 1995

Related U.S. Application Data

[63] Continuation of Ser. No. 916,718, Jul. 22, 1992, abandoned.
[51] Int. Cl.$^6$ .................................................. B60L 1/00
[52] U.S. Cl. ........................ 307/10.1; 364/424.05
[58] Field of Search .................... 307/9.1, 10.1, 307/10.7, 141, 141.4; 361/195–198; 340/425.5; 123/146.5 A; 455/345, 346; 364/145, 424.01, 424.05

[56] References Cited

U.S. PATENT DOCUMENTS

| | | | |
|---|---|---|---|
| 2,836,732 | 5/1958 | Newlin | 123/179.3 |
| 3,538,898 | 11/1970 | Edgemir | 123/179.1 |
| 3,696,333 | 10/1972 | Mott | 340/425.5 |
| 3,948,202 | 4/1976 | Yoshikawa | 307/9.1 |
| 4,637,359 | 1/1987 | Cook | 307/10.1 |
| 4,719,550 | 1/1988 | Powell et al. | 307/48 |
| 4,839,530 | 6/1989 | Greenwood | 307/10.1 |
| 4,864,154 | 9/1989 | Copeland et al. | 307/10.7 |
| 4,950,913 | 8/1990 | Kephart | 307/10.1 |
| 5,040,990 | 8/1991 | Suman et al. | 307/10.1 |
| 5,046,187 | 9/1991 | Takahashi | 379/93 |
| 5,159,257 | 10/1992 | Oka et al. | 307/10.7 |
| 5,272,386 | 12/1993 | Kephart | 307/10.1 |

Primary Examiner—William M. Shoop, Jr.
Assistant Examiner—Richard T. Elms
Attorney, Agent, or Firm—Dennison, Meserole, Pollack & Scheiner

[57] ABSTRACT

The present invention relates to a control unit for vehicle-borne electrical equipment, that is, to a control unit for turning on vehicle-borne electrical equipment either periodically or at a predetermined or preset time, providing power to the equipment for a further predetermined or preset time, and then suspending supply of power to the electrical equipment. These functions are accomplished by a programmable timer power switch (PTPS) unit in combination with further control circuitry, each of the latter two elements having its own timer units or circuity.

11 Claims, 2 Drawing Sheets

CONTROL UNIT FOR VEHICLE-BORNE ELECTRICAL EQUIPMENT

This is a continuation of application Ser. No. 07/916,718, filed Jul. 22, 1992, now abandoned.

BACKGROUND OF THE INVENTION

The present invention relates to a control unit for vehicle-borne electrical equipment including a presettable clock or other circuitry, having an alarm function for turning on electronic equipment in a motor vehicle. More specifically, the purpose of this invention is to turn on the two-way radio and data generator (Computer, MDC Signalling, Automatic Vehicle Locator, etc.), and for reporting at regular intervals while the vehicle is unattended.

Because of low cost and availability, more and more people demand constant communications. Whether this demand relates to voice or written communication or even computer terminals to store data, people are seeking ways to constantly keep abreast. The motor vehicle is becoming another part of the office and people are loading their or the company car with electronic communication-type terminals to receive and transmit data.

The battery of the automobile powers CBs, AM/FM radios, two-way radios, radar devices and other electronic data type communication systems. However, a problem developed from connecting numerous electronic equipment to the battery of the motor. This electronic equipment drains the car battery.

U.S. Pat. No. 4,950,913 relates to a monitoring device for monitoring a system battery powering an external device, such as a two-way radio or some other electronic-computer related equipment, when the motor is not running. During this time, the battery is discharged by the external device. The monitoring device allows the electronic communication system to run for a pre-set time. Upon the detection of a low battery voltage, the monitoring device of U.S. Pat. No. 4,950,913 shuts off the radio or other electronic data communication system.

While U.S. Pat. No. 4,950,913 solves the problem of turning off the electronic data communication systems that drain the vehicle battery, a device or system is needed to turn the electronic data communication system on at selected time intervals. Such a device could operate at selected time periods so the data communication system could receive or transmit data when the motor vehicle is not occupied. Upon entering the vehicle, the user could have the data available and not have to call in for such data. Such a solution, would save vast amounts of time for a driver, who while sleeping, eating or just not occupying the vehicle, can receive data necessary to continue a job function.

U.S. Pat. No. 4,839,530 to Greenwood discloses a system controlled by clock pulses. The system operates in an active mode and inactive or sleep mode. However, there is not any teaching for a timer circuit to switch the system on at predetermined time periods.

U.S. Pat. No. 5,040,990 to Suman et al. discloses a dashboard enhancement product which is mounted above the windshield and requires an automobile manufacturer to prewire the device to make it practical. The device is strictly a manual operated interface between the vehicle and the operator for monitoring and switching various functions within the vehicle.

U.S. Pat. No. 5,046,187 to Takahashi relates to mobile radio telephone communications. The disclosure describes a notification signal wherein an operator of the system receives the signal which is an indication that the data communication is complete.

The vehicle communication type systems exemplified in the patents referred to hereinabove illustrate the many improvements made over the years in simplifying and improving this aspect of data communication in and around motor vehicles. There still exists, however, in this industry, a need for a device or system which automatically operates without human intervention, at selected time periods, to turn the data electronic communication system of the motor vehicle on so that data communications can be implemented prior to the driver's occupying or utilizing the motor vehicle.

SUMMARY OF THE INVENTION

The programmable clock unit described is designed to overcome the problems of the prior art. Accordingly, the unit provides additional functions for the programmable timer power switch unit hereinafter referred to as PTPS unit. These functions are contained in modules that may be added at any time by plugging the I/O wires onto an eight pin header located on the PTPS unit.

While the PTPS is normally triggered on only by starting the vehicle engine, these modules trigger the PTPS unit on at predetermined or preset time periods. One module operates just twice each day, while the other can be made to repeat the trigger at regular preset intervals.

With these modules, a mobile radio system containing data units of various types may be turned on at predetermined times to send or receive information. For example, the circuitry permits unattended down-loading to the mobile data terminal or facsimile unit and/or the regular reporting of vehicle location.

Accordingly, it is an object of the invention to include a clock means connected to a programmable timer power switch unit with the clock means presettable to any of a plurality of time periods.

Another object of the invention is to include a circuit means connected between the clock means and the programmable timer power switch unit for receiving an alarm signal from the clock means during the presettable time period and for signalling the programmable timer power switch unit to receive power from a battery and switch on the power to equipment powered by the battery.

A further object of the invention is to include means for selecting one of the plurality of time periods.

An additional object of the invention is to include the alarm means for indicating the selected one of the plurality of time periods.

An advantage of the invention is a capacitor for providing a brief sustaining power source for the clock means so that the clock means is immune to sudden dips in the vehicle voltage.

Further objects and advantages of the invention will become apparent from a consideration of the drawings and ensuing description.

DESCRIPTION OF THE INVENTION

Figure 1:
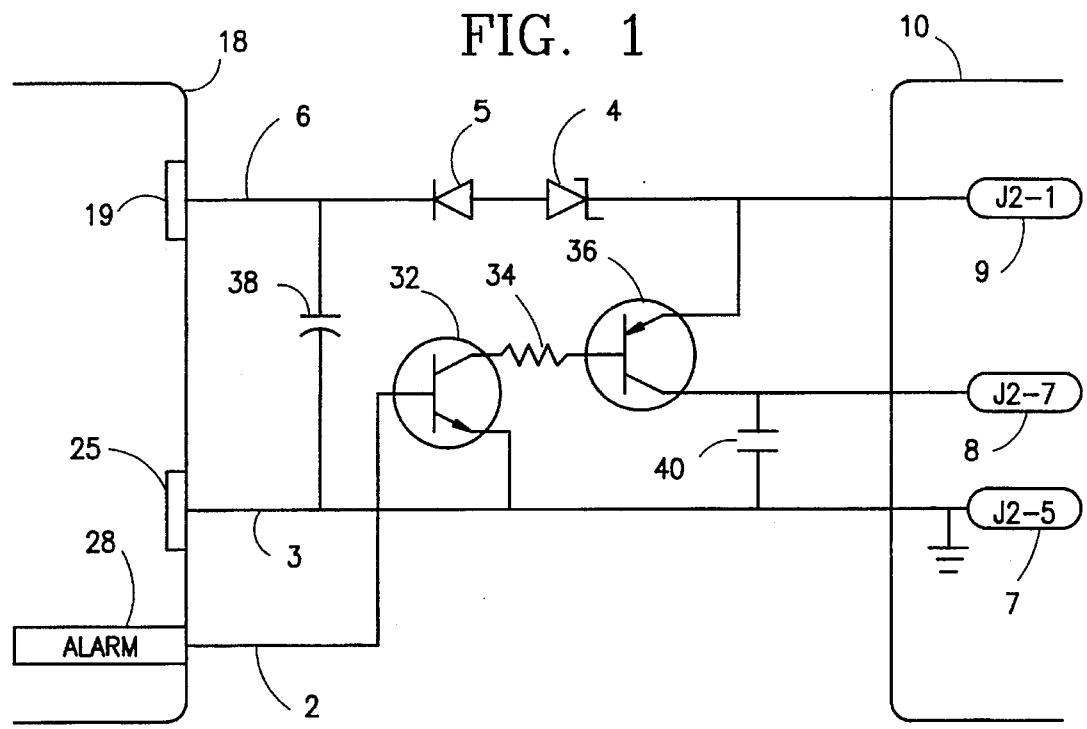
FIG. 1 is a schematic circuit diagram of a control unit for vehicle-borne electrical equipment having a programmable clock in accordance with the present invention.

FIG. 1 illustrates a schematic circuit diagram of the present invention. A programmable timer power switch or PTPS 10 is shown. The programmable timer power switch 10 is set forth in U.S. Pat. No. 4,950,513 and the disclosure therein is incorporated by reference.

Figure 3:
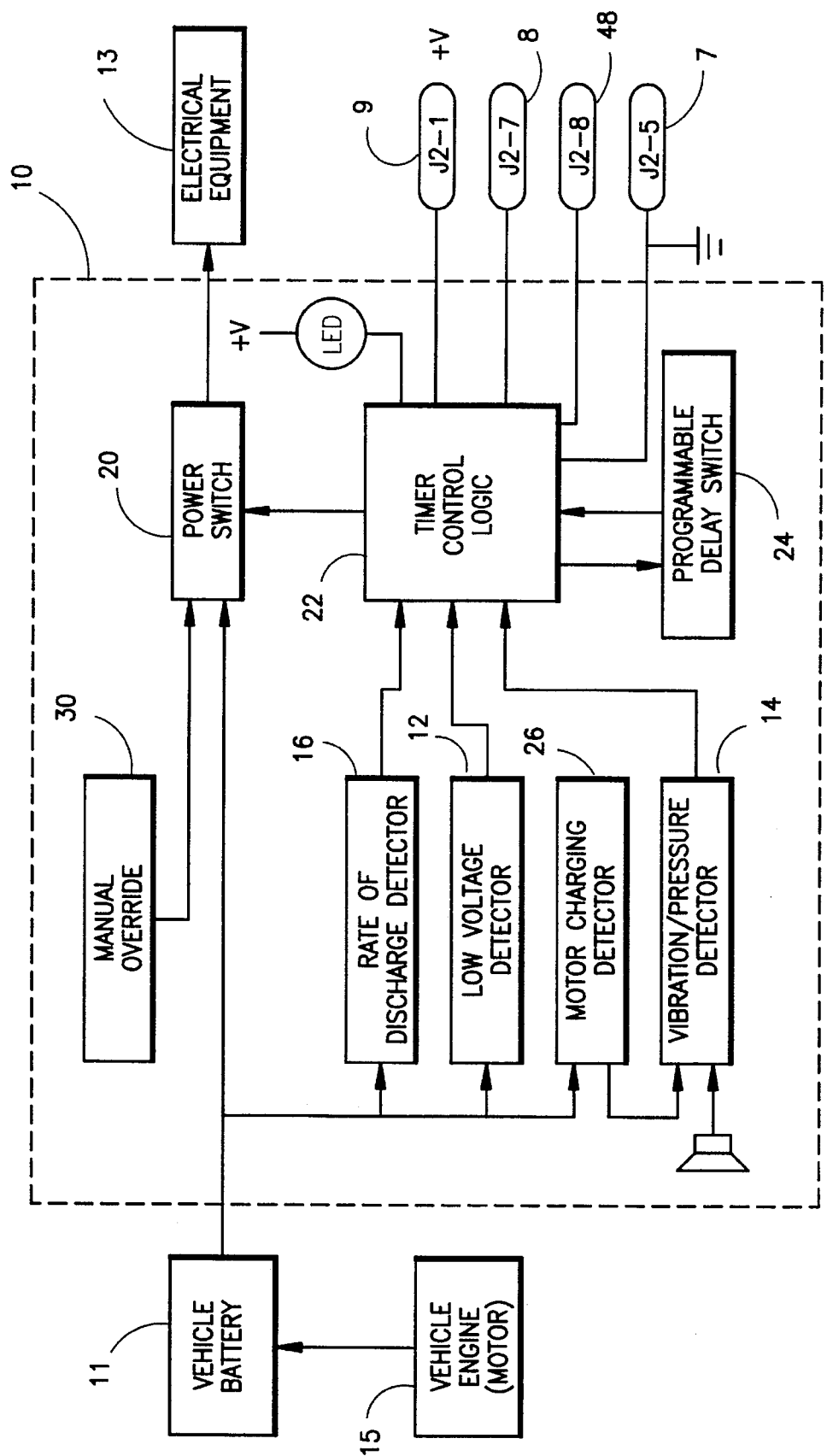
FIG. 3 is a block diagram of the control unit and programmable timer disclosed in U.S. Pat. No. 4,950,513.

FIG. 3 is the same block diagram shown in FIG. 1 of U.S. Pat. No. 4,950,913 with terminals 7–9 and 48 added. More specifically, applicant's prior system of FIG. 3 shows a vehicle engine 15 and a battery 11 connected in a conventional manner for supplying power to a package of electrical communication and data equipment 13. This equipment draws considerable power from the battery and is required to operate both while the engine is operating or is shut off.

With the engine in operation, the generator and battery can supply ample current for equipment 13. Engine operation is sensed by vibration detector 14 which sends a signal to timer control logic 22 which then energizes power switch 20 to connect vehicle battery 11 to the electrical equipment. Modules 16, 12, 26 sense system failures and override vibration detector 14 to open power switch 20 to disconnect the electrical equipment. Module 16 senses excessive current draw such as may occur with a short circuit. Module 12 detects low voltage as may occur with a weak battery.

Module 26 detects a defective generator. Any malfunction will be indicated by an LED connected to timer control logic 22.

The system described so far will safely maintain power to the electrical equipment as long as engine operation is sensed by vibration detector 14, but will disconnect the electrical equipment when the engine is shut down. In order to maintain power to the electrical equipment after the engine is shut down, a programmable delay switch 24 is added to the circuit. This delay switch is settable in approximately one hour increments and is connected in circuit with timer control logic 22 to maintain power switch 20 in a closed position for a predetermined length of time after being triggered on by an engine shutdown as sensed by vibration detector 14.

The system disclosed in U.S. Pat. No. 4,950,913 works well, but is limited to only one timing period after engine shutdown. The engine must be restarted to reset the system for another timing period. There is a need for a system with a repetitive timing cycle after engine shutdown. This desirable result is achieved by adding an additional timer to trigger operation of the PTPS 10 at preset time intervals. The additional timer is connected to existing ports in the PTPS shown at 7–9 and 48.

The programmable timer power switch 10 in a first embodiment of the invention shown in FIG. 1 includes three connecting ports. Port J2-1 generally indicated with numeral 9 is the Vcc port and provides voltage regulation at ten volts. Port J2-7 generally indicated as numeral 8 is subsequently connected to the test port of the programmable timer power switch 10 and provides a direct trigger input for the programmable timer power switch 10. Port J2-5 referenced by numeral 7 is connected to ground.

Reference numeral 18 refers to a wake-up clock. The clock 18 is an ordinary LCD display travel clock powered by a double AA (1.5 V) battery. In the embodiment, the clock is a quartz clock which can be purchased at any local discount store. For purposes of the present invention, the battery has been removed and the clock is powered directly from the programmable timer power switch 10 through port 9. Connecting the travel alarm clock and port 9 of the programmable timer power switch 10 is a line 6. Power line 6 is connected to a diode 5 having nomenclature IN914A and is an off the shelf type product. Connected to diode 5 is a zener diode 4 the output of the zener diode 4 is connected to the port 9 of programmable timer power switch 10.

Additionally, connecting the programmable timer power switch 10 and the travel alarm clock 18 is a ground line 3. The ground line 3 connects the ground of travel alarm clock 18 to the ground port 7 of the programmable timer power switch 10.

The travel alarm clock 18 includes an alarm port 28 connected to an alarm line 2. The alarm line 2 connects the alarm port 28 to the base of a transistor 32. The transistor 32 includes an emitter tied to ground line 3 and the collector connected to a resistor 34. The resistor 34 is connected to the base of a subsequent transistor 36. The emitter portion of transistor 36 is tied to power line 6 between the zener diode 4 and the power port 9. The collector of transistor 36 is connected to port 8 of the programmable timer power switch 10. Port 8 is a test input that operates the output relay when +10 volts are applied and triggers the time-out timer when the +10 volts are removed. Port 8 provides a quick and easy way to check the relay and timing circuits without installing the PTPS 10 in the vehicle.

Connected across the power port 19 and ground port 25 of the travel alarm clock 18 is a 100 microfarad capacitor 38. This capacitor 38 provides a brief sustaining power source to the alarm clock 18 if Vcc (+10 volts) is intermittently lost from PTPS 10. This eliminates the need for a separate clock back-up battery by making the alarm clock 18 immune to sudden dips in the vehicle voltage. Additionally, another capacitor 40 is connected to port 8 and port 7 of the programmable power switch 10. Capacitor 40 is a 4.7 microfarad capacitor. This capacitor 40 also connects the collector of transistor 36 to the ground line 3.

In operation, the diodes 5 and 4 drop the voltage from 10 voltages to 1.5 volts and block the discharge of capacitor 38 back through the programmable timer power switch 10. This blocking function makes the alarm clock 18 immune to sudden dips in the vehicle voltage. The alarm output 28 is taken from the circuitry within the clock that drives the audible buzzer (not shown).

Figure 2:
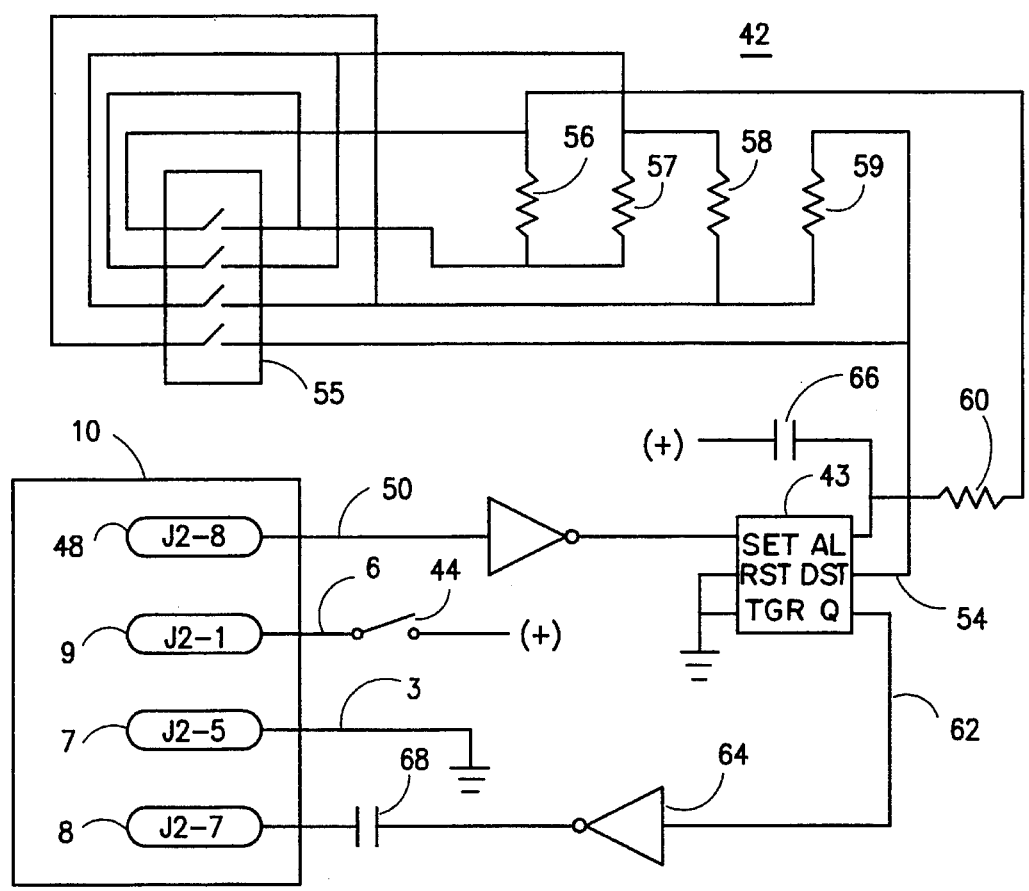
FIG. 2 is a block diagram of programmable timer circuitry for vehicle electrical or communication equipment made in accordance with the present invention.

FIG. 2 is a schematic diagram of a second embodiment having an external pre-set repeat timer 42. Instead of a trigger signal being produced once in each 24 hour period as with the wake-up clock 18 of FIG. 1, this circuit 42 provides reoccurring trigger signals from 15 minutes to 15 hours. Circuit 42 can be modified to an infinite amount of time periods such as 30 minutes to 30 hours or 1 hour to 60 hours. It could also be made with a single fixed time period of the customer's choice for simplicity in manufacturing.

The external pre-set repeat timer 42 receives power through switch 44 over power line 20 and by way of power port 9 of PTPS 10. The ground port 7 is still connected to ground through ground line 3. A new signal line 50 is connected to power switch 10 by way of output port 48 and output line 50 is connected to an inverter 52 which is connected to the set pin of latch 43. The reset pin of latch 43 is tied to the ground line. The disabled pin is connected to a switch line 54 which leads to a dip switch 55. The dip switch 55 can be set by the user to any of a number of positions. A plurality of resistors 56–60 balance out the circuit. The trigger signal 62 is generated through the Q pin of latch 43. The signal 62 is fed to another inverter 64 which feeds a capacitor 68 and is received by unit 10 through port 8.

With this circuit 42, the programmable timer power switch 10 is turned on by the normal method of starting the engine. However, instead of remaining off after time-out until the engine is restarted, the unit 10 will remain off only until the external pre-set repeat timer 42 produces the trigger signal 62 at the end of its time period. This signal will turn the unit 10 back on for the time period for which the unit is set. It will continue to repeat this cycle until the external repeat time has been disabled or the engine is started.

While the above description contains many specificities, these should not be construed as limitations on the scope of the invention, but rather as exemplification of one preferred embodiment thereof. Many other variations are possible. Accordingly, the scope of the invention should be determined not by the embodiments illustrated, but by the appended claims and their legal equivalents.

I claim:

1. In a control unit for controlling the application of power supplied by a battery to electrical equipment carried by a vehicle having an engine, comprising:

switch means connected between said battery and said electrical equipment for selectively blocking and supplying power to said electrical equipment, and control means connected to said switch means for providing first and second control outputs to said switch means, said switch means responsive to said first control output for blocking power to said electrical equipment, and said switch means responsive to said second control output for supplying power to said electrical equipment;

the improvement wherein said control means is responsive to shutting off of the engine of the vehicle for providing said first control output to said switch means, thereby blocking power to said electrical equipment, and wherein said control means comprises a timer which is responsive to shutting off of the engine of the vehicle for carrying out a timing operation, and wherein said control means is responsive to completion of the timing operation of said timer for providing said second control output to said switch means, thereby supplying power to said electrical equipment.

2. In the control unit of claim 1, wherein said switch means comprises a further timer responsive to said second control output from said control means for initiating a timing operation, said switch means responsive to completion of the timing operation of said further timer for blocking power to said electrical equipment.

3. In the control unit of claim 1, wherein said timer of said control means comprises a clock which is settable by a user to an alarm time, said timer responsive to reaching of said alarm time for completing the timing operation of said timer, for providing said second control output to said switch means, and for commencing a new timing operation, whereby the timing operation of said timer of said control means is completed each time said alarm time is reached.

4. In the control unit of claim 3, wherein said control means is responsive to turning on of the engine for disabling the timing operation of said timer of said control means.

5. In the control unit of claim 3, wherein said timer of said control means further comprises capacitor means connected between said clock and said switch means for sustaining power to said clock in the event of a drop in power supplied to said clock.

6. In the control unit of claim 5, wherein said timer of said control means further comprises diode means connected between said capacitor means and said switch means for blocking discharge of said capacitor means through said switch means.

7. In the control unit of claim 3, wherein said timer of said control means further comprises power line means connecting said clock to said switch means for receiving power from said switch means for the operation of said clock.

8. In the control unit of claim 1, wherein said timer of said control means comprises a circuit which is settable by a user to a given time duration defining the duration of the timing operation of said timer, said timer of said control means responsive to passage of the given time duration for completing the timing operation, for providing said second control output to said switch means, and for commencing a new timing operation, whereby the timing operation of said timer of said control means is completed each time the given time duration set by the user passes.

9. In the control unit of claim 8, wherein said timer further comprises latch means connected to said circuit for generating said second control output in accordance with the timing operation defined by the given time duration set by the user.

10. In the control unit of claim 8, wherein said circuit is selectively settable by the user to any one of a plurality of time durations.

11. In the control unit of claim 8, wherein said control means is responsive to turning on of the engine for disabling the timing operation of said timer of said control means.

* * * * *